United States Patent [19]

Schroder et al.

[11] 4,038,671
[45] July 26, 1977

[54] PHOTOGRAPHIC APPARATUS WITH TWO PICTURE TAKING LENSES

[75] Inventors: Rolf Schroder, Baldham; Reinhard Nicko, Munich, both of Germany

[73] Assignee: AGFA-Gevaert Aktiengesellschaft, Leverkusen, Germany

[21] Appl. No.: 716,297

[22] Filed: Aug. 20, 1976

[30] Foreign Application Priority Data

Aug. 29, 1975   Germany ............................ 2538426

[51] Int. Cl.² .......................... G03B 3/00; G03B 13/02
[52] U.S. Cl. ................................................. 354/197
[58] Field of Search ................ 354/195, 197; 352/142

[56] References Cited

U.S. PATENT DOCUMENTS

| 3,185,061 | 5/1965 | Westphalen | 354/197 |
| 3,903,537 | 9/1975 | Ettischer | 354/197 |

Primary Examiner—John Gonzales
Attorney, Agent, or Firm—Peter K. Kontler; John Kurucz

[57] ABSTRACT

A photographic apparatus, particularly a still camera, wherein two lenses having different focal lengths are pivotable about the axes of two shafts which are located diametrically opposite each other with respect to the axis of a third shaft which supports a two-armed lever. The mounts of the lenses are coupled to the adjacent arms of the lever by pin-and-slot connections, and the lever is pivotable by a reciprocable knob to move one of the lenses into register with the light-admitting aperture when the knob is moved in one direction and to move the other lens into register with the aperture when the knob is moved in the opposite direction. The lenses are installed in the camera body at the opposite sides of the aperture, and the body has stops which arrest the respective lenses in operative positions. The lever has cams which cooperate with a leaf spring to yieldably hold either of the two lenses in register with the aperture. The shafts for the lenses and the respective lenses are adjustable axially in parallelism with the optical axes of such lenses.

10 Claims, 2 Drawing Figures

4,038,671

PHOTOGRAPHIC APPARATUS WITH TWO PICTURE TAKING LENSES

BACKGROUND OF THE INVENTION

The present invention relates to photographic apparatus with interchangeable lenses. More particularly, the invention relates to still cameras or motion picture cameras of the type having two or more picture taking lenses which need not be removed from the camera when the user wishes to place a selected lens into register with the shutter and light-admitting aperture.

German Pat. No. 451,394 discloses a photographic apparatus with two picture taking lenses either of which can be moved into register with the light-admitting aperture. The two lenses are mounted on a common support (e.g., a turret) which is pivotable through 180°. One of the lenses is in register with the aperture in one end position and the other lens is in register with the aperture in the other end position of the turret. A drawback of such photographic apparatus is that the turret occupies too much room which is at a preminum in pocket-sized miniature cameras of the type presently preferred by amateur photographers.

German Utility Model No. 1,424,885 discloses another photographic apparatus with two picture taking lenses. Each lens is movable independently of the other into and from register with the light-admitting aperture. Such proposal also failed to find acceptance in the industry because the space requirements of the lenses and their mounting means are excessive. Moreover, the just described photographic apparatus must be equipped with several actuating means, one for each lens. This contributes to the bulk, cost and complexity of the apparatus.

SUMMARY OF THE INVENTION

An object of the invention is to provide a novel and improved photographic apparatus with interchangeable picture taking lenses wherein a single actuating member suffices to move a selected lens into register with the light-admitting aperture.

Another object of the invention is to provide a still camera or motion picture camera wherein the lenses and the moving means therefor occupy little room and wherein such moving means comprises a small number of simple, compact and inexpensive parts.

A further object of the invention is to provide a photographic apparatus wherein the selected lens is reliably held in a position of accurate register with the light-admitting aperture and the shutter.

An additional object of the invention is to provide novel and improved means for moving either of two permanently installed lenses of a still camera or motion picture camera to or from a position of register with the shutter.

An ancillary object of the invention is to provide a photographic apparatus wherein a single actuating member suffices to move either of two picture taking lenses into an optimum position for the making of exposures.

The improved photographic apparatus may constitute a still camera or a motion picture camera and comprises a housing or body, means (e.g., a plate which is mounted in or forms part of the housing) defining a light-admitting aperture in the housing, first and second picture taking lenses (e.g., a first lens having an average focal length and a second lens which constitutes a telephoto lens), first and second pivots or shafts mounted in the housing in parallelism with the optical axes of the lenses, first and second lens mounts forming part of the respective lenses and being secured to and movable about the axes of the first and second shafts between first and second positions in which the first and second lenses respectively register with the light-admitting aperture, and means for moving the two mounts in unison between the first and second positions. The moving means comprises a displacing device (e.g., a two-armed lever), pivot means for the displacing device (such pivot means is mounted in or on the housing between the first and second shafts), and first and second motion transmitting means (each of which may constitute a pin-and-slot connection) for respectively coupling the displacing device with the first and second lens mounts. The two shafts are preferably disposed diametrically opposite each other with respect to the axis of pivot means for the displacing device. If the displacing device is or comprises a lever, one arm of the lever is articulately connected to the first mount and the other arm of the lever is articulately connected to the second mount so that the lenses move in opposite directions when the lever is pivoted (preferably by a reciprocable actuating member) to move the one or the other lens into register with the light-admitting aperture.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
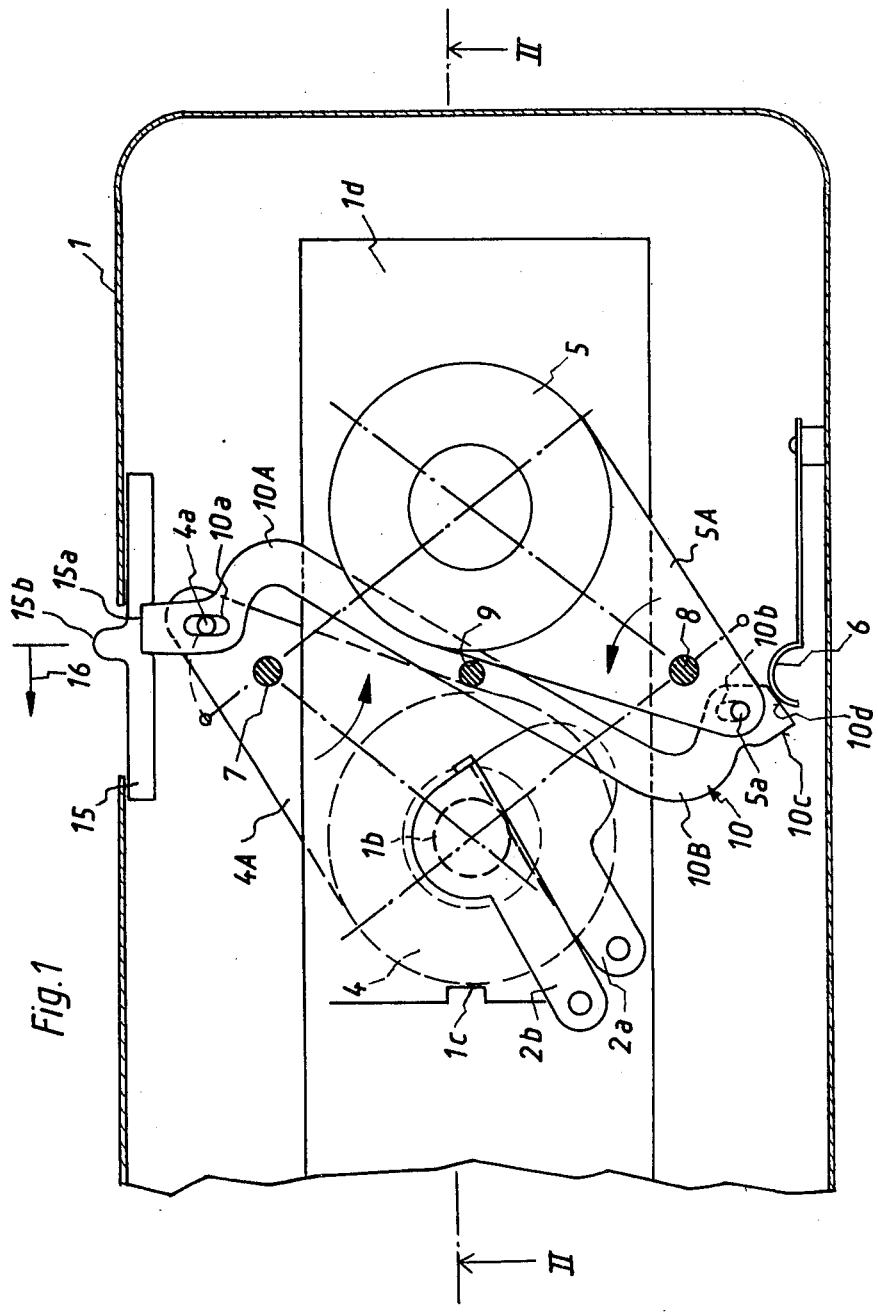
FIG. 1 is a schematic longitudinal vertical sectional view of a photographic apparatus which embodies the invention.
Figure 2:
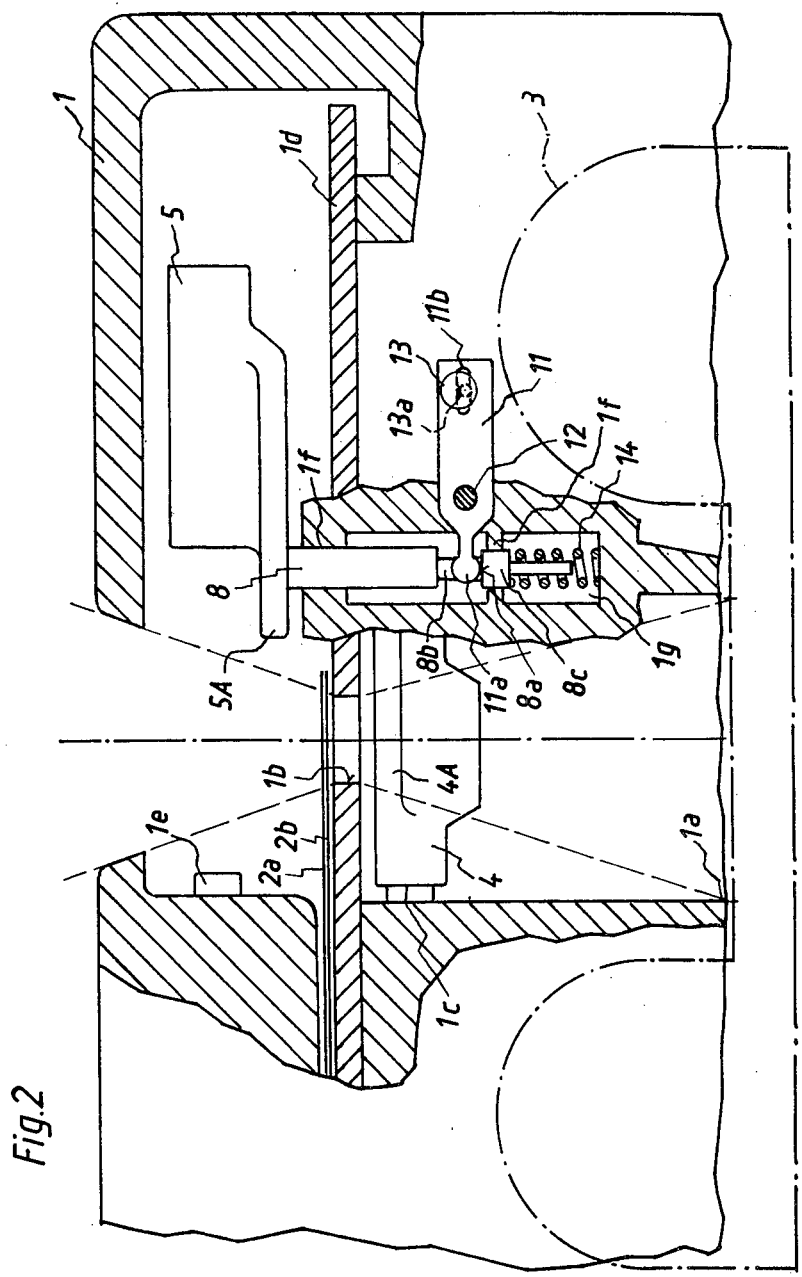
FIG. 2 is a fragmentary sectional view substantially as seen in the direction of arrows from the line II—II of FIG. 1.

FIGS. 1 and 2 show a photographic apparatus which constitutes a still camera having a housing or body 1 including a plate 1d provided with a light-admitting aperture 1b. The aperture 1b is located in front of a window 1a which, in turn, is located in front of the foremost unexposed film frame in a magazine or cassette 3 which is indicated by phantom lines. The shutter of the camera includes two blades 2a, 2b which are mounted in the housing 1 in front of the plate 1d and are movable with and relative to each other to admit scene light through the aperture 1b when the user actuates the camera release (not shown) and to terminate the exposure after a preset interval of time or in response to a signal from an automatic exposure control.

The housing 1 further contains two picture taking lenses including a first lens 4 of average focal length and a telephoto lens 5. The mounts or barrels of the lenses 4 and 5 respectively comprise laterally extending arms 4A, 4B which are mounted on pivots or shafts 7 and 8. These pivots are installed in the camera housing 1 and are located diametrically opposite each other with respect to the axis of a further pivot or shaft 9 for a two-armed displacing lever 10 serving as a means for moving the lenses 4, 5 between first positions (shown in FIGS. 1 and 2 in which the lens 4 registers with the apertures 1b), and second positions in which the lens 5 is in register with the aperture 1b. The arm 4A of the mount of the lens 4 is articulately coupled to the arm 10A of the lever 10 by a motion transmitting pin-and-slot connection 4a, 10a, and the arm 5A of the mount of the lens 5 is articulately coupled to the arm 10B of the lever 10 by a similar pin-and-slot connection 5a, 10b. The free end of the arm 10A extends into a notch 15a at the rear or inner side of an actuating member or slide 15 which is reciprocably mounted in the housing 1 so that its handgrip portion or knob 15b is accessible at the outer side of the housing. The user can move the knob 15b in and counter to the direction indicated by arrow 16.

It will be noted that the plate 1d is located in a plane which is normal to the optical axes of the lenses 4, 5 and to the axes of the pivots 7, 8, 9, that the lens 4 is located at one (inner) side of such plane, and that the lens 5 is located at the other (outer) side of such plane. This insures that the lenses 4, 5 cannot interfere with each other when the knob 15b is moved in or counter to the direction indicated by arrow 16.

The housing 1 is provided with two internal stops 1c and 1e. The stop 1c serves to arrest the lens 4 when the optical elements of this lens are in exact register with the aperture 1b, and the stop 1e arrests the lens 5 when the optical elements of this lens are in an optimum position with respect to the aperture 1b and with respect to the foremost unexposed film frame in the cassette 3.

The free end of the arm 10B of the displacing lever 10 has two mutually inclined cams 10c and 10d which make an acute, right or obtuse angle with each other. A leaf spring 6 or an analogous resilient element which is mounted in the housing 1 cooperates with the cam 10d to yieldably hold the displacing lever 10 in a position in which the lens 4 registers with the aperture 1b. The leaf spring 6 cooperates with the cam 10c when the lever 10 assumes the other end position in which the aperture 1b is in exact register with the lens 5, i.e., when the mount of this lens abuts the stop 1e. The spring 6 and the cams 10c, 10d constitute a simple detent for yieldably holding either of the two lenses in the respective operative position.

The photographic apparatus further comprises means for moving the lenses 4 and 5 axially, i.e., for moving the lens 4 axially of the pivot 7 and for moving the lens 5 axially of the pivot 8 independently of the lens 4. The drawing merely shows the means for moving the pivot 8 for the lens 5. This pivot is rigid with the arm 5A of the mount of the lens 5 and is rotatable and reciprocable in suitable friction bearings 1f of the housing 1. An intermediate portion 8b of the pivot 8 has a reduced diameter to provide room for the spherical head 11a at the free end of one arm of an adjusting lever 11 which is fulcrumed in the housing 1, as at 12, and the other arm of which has an elongated slot 11b for the eccentric pin 13a of a rotary knob 13. The latter is accessible to the user of the camera so that, by rotating the knob 13, the user can pivot the adjusting lever 11 to thereby move the pivot 8 axially under or against the bias of a helical spring 14 which is installed in a socket 1g of the housing 1 and bears against the rear side of a collar 8c forming part of the pivot 8 and having a shoulder 8a which abuts against the head 11a. The manner in which the pivot 7 for the lens 4 is movable axially relative to the housing 1 is analogous.

The operation:

FIGS. 1 and 2 show the picture taking lenses 4 and 5 in their first positions in which the arm 4A of the mount of the lens 4 abuts the stop 1c of the housing 1 and the cam 10d of the displacing lever 10 is engaged by the arcuate portion of the leaf spring 6. This insures that the optical elements of the lens 4 are in exact register with the light-admitting aperture 1b. The lens 4 is located behind the aperture 1b and shutter blades 2a, 2b. The photographic apparatus is ready to make exposures with a lens of average focal length (e.g., 50 millimeters).

If the user wishes to use the other (telephoto) lens 5, the knob 15b of the actuating member 15 is moved in the direction indicated by arrow 16. The finger of the user must overcome the bias of the spring 6 which rides over the tip between the cams 10c, 10d while the actuating member 15 causes the displacing lever 10 to pivot anticlockwise, as viewed in FIG. 1. The pin-and-slot connection 4a, 10a causes the arm 4A of the mount of the lens 4 to pivot counterclockwise about the axis of the pivot 7 and the pin-and-slot connection 5a, 10b causes the arm 5A of the mount of the lens 5 to pivot anticlockwise about the axis of the pivot 8. The movement of the actuating member 15 in the direction indicated by arrow 16 is terminated when the mount of the lens 5 engages the stop 1e, i.e., when the leaf spring 6 of the detent means engages the cam 10c. The optical elements of the lens 5 are then in accurate register with the aperture 1b.

In order to return the lens 4 to the position shown in FIGS. 1 and 2, the user simply pushes or pulls the knob 15b counter to the direction indicated by the arrow 16 whereby the lenses 4, 5 reassume the illustrated positions when the mount of the lens 4 engages the stop 1c.

An important advantage of the improved photographic apparatus is that the means for moving the lenses 4, 5 to and from operative positions occupies little room, that such means comprises a small number of simple and inexpensive parts, and that the lenses need not be mounted on a turret or the like. Also, the manipulation of means for moving the lenses is simple and each of the lenses is reliably held in the operative position until and unless the user decides to move the other lens into register with the light-admitting aperture 1b. Still further, a single actuating member (15) suffices to move the lens 4 or 5 to operative position. Finally, the two lenses can be installed in the interior of the housing 1 (even though the invention can be embodied with equal advantage in photographic apparatus wherein one or both lenses are located outside of the housing.

It will be noted that, even though the arms 4A and 5A rotate in the same direction when the displacing lever 10 pivots about the axis of the member 9, the lenses 4 and 5 actually move in opposite directions (the lens 5 moves in a direction to the left and the lens 4 moves in a direction to the right, as viewed in FIG. 1, when the actuating member 15 is moved in the direction indicated by arrow 16). Such mode of mounting the lenses also contributes to compactness of the photographic apparatus.

The displacing lever 10 may comprise three or more arms whereby the additional arm or arms perform other functions while the lever 10 is pivoted to or from the position which is shown in the drawing.

Without further analysis, the foregoing will so fully reveal the gist of the present invention that others can, by applying current knowledge, readily adapt it for various applications without ommitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. In a photographic apparatus, a combination comprising a housing; means defining a light-admitting aperture in said housing; first and second picture taking lenses; first and second pivots mounted in said housing in parallelism with the optical axes of said lenses, said first and second lenses respectively having first and second mounts movable about the axes of said first and second pivots between first and second positions in which said first and second lenses respectively register with said aperture; and means for moving said mounts, including a displacing member, pivot means for said displacing member, said pivot means being mounted in said housing intermediate said first and second pivots, and first and second motion transmitting means respectively coupling said displacing member with said first and second lens mounts.

2. A combination as defined in claim 1, wherein said lenses have different focal lengths and said first and second pivots are disposed diametrically opposite each other with respect to the axis of said pivot means for said displacing member.

3. A combination as defined in claim 1, wherein each of said motion transmitting means comprises a pin-and-slot connection and said displacing member is a lever having a first arm connected to said first lens mount and a second arm connected to said second lens mount so that said mounts turn in response to pivoting of said lever.

4. A combination as defined in claim 1, further comprising actuating means mounted in and accessible at the outside of said housing, said actuating means being movable relative to said housing and being operatively connected with said displacing member to move said lens mounts between said first and second positions in response to movement of said actuating means with respect to said housing.

5. A combination as defined in claim 1, further comprising stop means provided in said housing and abutting against that lens mount which registers with said aperture.

6. A combination as defined in claim 1, further comprising detent means for yieldably holding that mount which registers with said aperture.

7. A combination as defined in claim 6, wherein said detent means comprises a resilient element mounted in said housing and two cams provided on said displacing member, one of said cams being engaged by said resilient means in the first positions of said mounts and the other of said cams being engaged by said resilient means in the second positions of said mounts.

8. A combination as defined in claim 1, further comprising means for moving said first and second lenses in the axial direction of the respective pivots.

9. A combination as defined in claim 1, wherein said aperture is disposed in a plane which is substantially normal to the axis of said pivot means, said lenses being disposed at the opposite sides of said plane.

10. A combination as defined in claim 1, wherein said lenses are located in the interior of said housing.

* * * * *